United States Patent
Jun

(10) Patent No.: US 11,686,915 B2
(45) Date of Patent: Jun. 27, 2023

(54) LENS MODULE AND CAMERA MODULE

(71) Applicant: SAMSUNG ELECTRO-MECHANICS CO., LTD., Suwon-si (KR)

(72) Inventor: Jae Woo Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 299 days.

(21) Appl. No.: 17/072,234

(22) Filed: Oct. 16, 2020

(65) Prior Publication Data

US 2021/0318509 A1 Oct. 14, 2021

(30) Foreign Application Priority Data

Apr. 8, 2020 (KR) .................. 10-2020-0042895

(51) Int. Cl.
*G02B 7/02* (2021.01)
*G03B 17/12* (2021.01)

(52) U.S. Cl.
CPC .............. *G02B 7/022* (2013.01); *G03B 17/12* (2013.01); *G03B 2205/0046* (2013.01)

(58) Field of Classification Search
CPC . G03B 7/022; G03B 17/12; G03B 2205/0046
See application file for complete search history.

(56) References Cited

U.S. PATENT DOCUMENTS

| | | | |
|---|---|---|---|
| 11,086,103 B2* | 8/2021 | Jun | F03G 7/065 |
| 11,105,319 B2* | 8/2021 | Miller | G02B 6/3584 |
| 2014/0009631 A1 | 1/2014 | Topliss | |
| 2015/0135703 A1* | 5/2015 | Eddington | G03B 5/00 60/528 |
| 2016/0033786 A1 | 2/2016 | Kim et al. | |
| 2020/0028998 A1 | 1/2020 | Jun | |
| 2020/0028999 A1 | 1/2020 | Jun | |
| 2020/0041872 A1* | 2/2020 | Köpfer | G02B 7/09 |
| 2020/0073200 A1 | 3/2020 | Eom | |

(Continued)

FOREIGN PATENT DOCUMENTS

| CN | 105190429 A | 12/2015 |
|---|---|---|
| CN | 110032024 A | 7/2019 |

(Continued)

OTHER PUBLICATIONS

Chinese Office Action dated Jun. 9, 2021 issued in counterpart Chinese Utility Model Application No. 202023100663.0 (3 pages in English and 2 pages in Chinese).

(Continued)

*Primary Examiner* — Clayton E. La Balle
*Assistant Examiner* — Diana Hancock
(74) *Attorney, Agent, or Firm* — NSIP Law

(57) ABSTRACT

A lens module includes: a carrier having an internal space; a lens unit including a plurality of lens groups, the lens unit being installed on the carrier such that at least one of the lens groups is configured to move in a length direction of the carrier; a lens guide assembly including a plurality of guide members disposed on side surfaces of each of the lens groups, and configured to guide movement of at least two lens groups among the plurality of lens groups; and at least two driving wires connected to the plurality of guide members and formed of a shape memory alloy.

15 Claims, 7 Drawing Sheets

(56) References Cited

U.S. PATENT DOCUMENTS

| | | | |
|---|---|---|---|
| 2020/0142161 A1 | 5/2020 | Jun | |
| 2020/0310224 A1* | 10/2020 | Fang | G03B 3/10 |
| 2020/0371409 A1* | 11/2020 | Huang | G03B 13/34 |
| 2022/0066124 A1* | 3/2022 | Jun | G02B 7/08 |
| 2022/0066125 A1* | 3/2022 | Jun | G02B 7/08 |

FOREIGN PATENT DOCUMENTS

| | | |
|---|---|---|
| CN | 210803937 U | 6/2020 |
| DE | 20 2009 012 680 U1 | 3/2011 |
| JP | 5030762 B2 | 9/2012 |
| KR | 10-0730910 B1 | 6/2007 |
| KR | 10-2019-0096133 A | 8/2019 |
| KR | 10-2020-0009823 A | 1/2020 |
| KR | 10-2020-0009868 A | 1/2020 |
| KR | 10-2020-0024496 A | 3/2020 |

OTHER PUBLICATIONS

Korean Office Action dated May 18, 2021 in counterpart Korean Patent Application No. 10-2020-0042895 (9 pages in English)(6 pages in Korean).
Chinese Office Action dated Nov. 1, 2022, in counterpart Chinese Patent Application No. 202011520569.2 (8 pages in English, 9 pages in Chinese).

* cited by examiner

LENS MODULE AND CAMERA MODULE

CROSS-REFERENCE TO RELATED APPLICATIONS

This application claims the benefit under 35 U.S.C. § 119(a) of Korean Patent Application No. 10-2020-0042895 filed on Apr. 8, 2020 in the Korean Intellectual Property Office, the entire disclosure of which is incorporated herein by reference for all purposes.

BACKGROUND

1. Field

The following description relates to a lens module and a camera module including the lens module.

2. Description of Related Art

Recently, a camera has been employed in a portable electronic device such as a smartphone, and also a tablet PC, a laptop, and the like, and an autofocusing function, an optical image stabilization function, a zoom function, and the like, have been added to a camera used for a portable electronic device.

However, to implement various functions, a structure of a camera module has become complex, and a size of a camera module has been increased, such that a size of a portable electronic device on which a camera module is mounted may increase.

With the growth of a smartphone camera market, there has been a continuous attempt to reduce and integrate functions of a general manual camera, such as an OIS driving method and also an autofocusing (AF) function, an optical zoom function, and the like. Accordingly, structures have been diversified such that there has been demand for an OIS driving method different from a general OIS method.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lens module includes: a carrier having an internal space; a lens unit including a plurality of lens groups, the lens unit being installed on the carrier such that at least one of the lens groups is configured to move in a length direction of the carrier; a lens guide assembly including a plurality of guide members disposed on side surfaces of each of the lens groups, and configured to guide movement of at least two lens groups among the plurality of lens groups; and at least two driving wires connected to the plurality of guide members and formed of a shape memory alloy.

The plurality of guide members may include a first guide member disposed on one of the side surfaces of the lens group, a second guide member disposed to overlap the first guide member, a third guide member disposed on another one of the side surfaces of the lens group, and a fourth guide member disposed to overlap the third guide member.

The first guide member may include a plurality of first guide holes disposed to be inclined in one direction. The second guide member may include a plurality of second guide holes disposed to intersect the first guide holes. The third guide member may include a plurality of third guide holes disposed to be inclined in the one direction. The fourth guide member may include a plurality of fourth guide holes disposed to intersect the third guide holes.

The first guide member may include a first gear installation hole disposed in a central portion of the first guide member. The second guide member may include a second gear installation hole disposed to correspond to the first gear installation hole. The third guide member may include a third gear installation hole disposed in a central portion the third guide member. The fourth guide member may include a fourth gear installation hole disposed to correspond to the third gear installation hole.

The first to fourth gear installation holes may include thread portions disposed on internal surfaces of the first to fourth guide members, respectively.

The lens module may further include a plurality of lifting support gears engaged with the thread portions.

The first to fourth guide members may include detachment prevention holes configured to prevent detachment of the first to fourth guide members from the carrier.

The at least two driving wires may include first and second driving wires connected to the first guide member and intersecting each other, third and fourth driving wires connected to the second guide member and intersecting each other, fifth and sixth driving wires connected to the third guide member and intersecting each other, and seventh and eighth driving wires connected to the fourth guide member and intersecting each other.

The carrier may include a bottom plate, a front plate disposed on one surface of the bottom plate, a rear plate disposed to oppose the front plate, and a cover plate disposed to oppose the bottom plate.

The extension portion may be disposed on the cover plate and extend to a central portion of each of the front plate and the rear plate. A first lifting support gear may be rotatably coupled to the extension portion and the front plate. A second lifting support gear may be rotatably coupled to the extension portion and the rear plate.

The bottom plate may include: a support portion having an upper surface on which the lens unit is disposed; and a mounting portion on which an installation bar connected to first ends of the at least two driving wires is disposed.

Second ends of the at least two driving wires may be connected to a respective guide member among the plurality of guide members.

The lens unit may include a first lens group fixed to and installed on one end of the carrier, a second lens group disposed on a rear end of the first lens group in a light incident direction and configured to move, and a third lens group disposed on a rear end of the second lens group and configured to move.

The second and third lens groups may include coupling projections coupled to a respective guide member among the plurality of guide members.

In another general aspect, a camera module includes: a reflective module configured to change light incident to the camera module; and a lens module configured to pass light having a path changed by the reflective module. The lens module includes: a carrier having an internal space; a lens unit including a plurality of lens groups, the lens unit being installed on the carrier such that at least one of the lens groups is configured to move in a length direction of the carrier; a lens guide assembly including a plurality of guide members disposed on side surfaces of each of the lens groups, and configured to guide movement of at least two lens groups among the plurality of lens groups; and at least two driving wires connected to the plurality of guide members and formed of a shape memory alloy.

The camera module may further include a plurality of lifting support gears engaged with thread portions of the plurality of guide members.

The thread portions may be disposed in gear installation holes disposed in central portions of the plurality of guide members.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
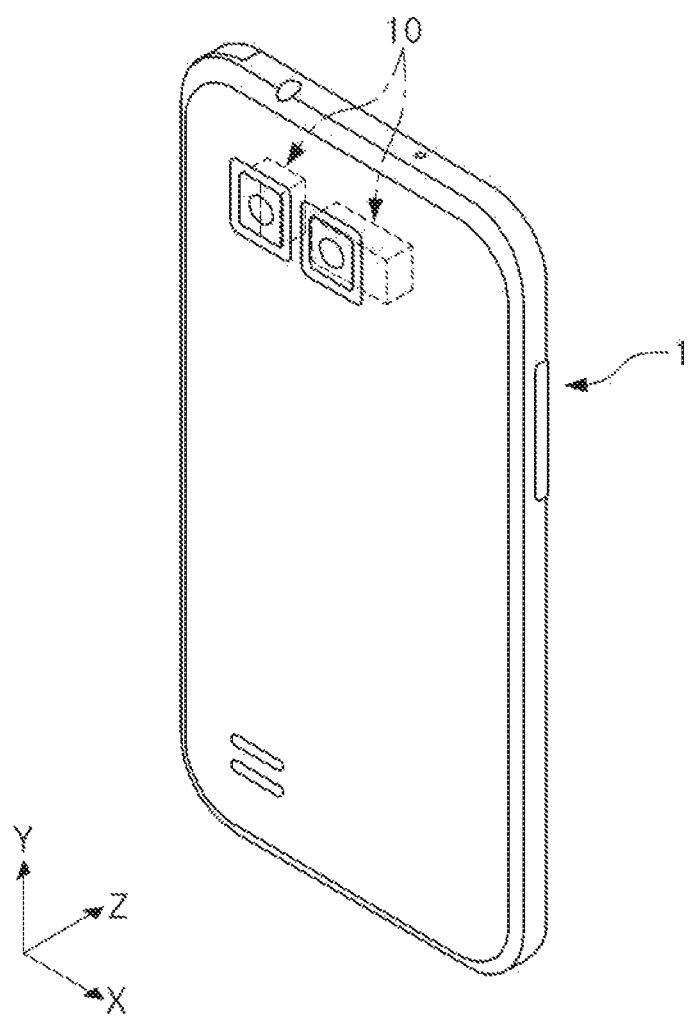
FIG. 1 is a perspective diagram illustrating a portable electronic device, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

FIG. 1 is a perspective diagram illustrating a portable electronic device 1, according to an embodiment.

Referring to FIG. 1, the portable electronic device 1 may be implemented by a mobile communications terminal device, a smartphone, a tablet PC, or the like, on which a camera module 10 is mounted.

As illustrated in FIG. 1, the portable electronic device 1 may include two camera modules 10 configured to image an object.

One of the camera modules 10 may include a plurality of lenses, and an optical axis (e.g., a Y axis) of the plurality of lenses may be disposed in a direction perpendicular to a thickness direction (e.g., a Z axis direction, a direction from a front surface towards a rear surface of the portable electronic device, or an opposite direction thereof). As an example, the other one of the camera modules 10 may include another plurality of lenses having an optical axis (e.g., the Z axis) formed in a thickness direction (e.g., the Z axis direction) of the portable electronic device 1.

Accordingly, even when the camera modules 10 include an autofocusing (AF) function, a zoom function, and an optical image stabilization (OIS) function, a thickness of the portable electronic device 1 may not increase. Accordingly, the portable electronic device 1 may have a reduced size.

Each of the camera modules 10 in the example embodiment may include any one or any combination of any two or more of an AF function, a zoom function, and an OIS function.

A camera module including AF, zoom, and OIS functions may include various components. Accordingly, a size of the camera module including AF, zoom, and OIS functions may be greater than that of a general camera module.

When a size of a camera module increases, it may be difficult to reduce a size of a portable electronic device on which the camera module may be mounted.

For example, a camera module may include an increased number of stacked lenses to implement a zoom function, and when the plurality of stacked lenses are disposed in a thickness direction of a portable electronic device, a thickness of the portable electronic device may increase according to the number of the stacked lenses. Accordingly, it may be difficult to implement a sufficient number of stacked lenses without increasing a thickness of the portable electronic device such that a zoom function may be weakened.

Also, to implement an AF function and an OIS function, an actuator for moving a lens group in an optical axis direction or a direction perpendicular to an optical axis may need to be installed. When an optical axis (e.g., a Z axis) of the lens group is formed in a thickness direction of a portable electronic device, however, an actuator for moving the lens group may need to be disposed in a thickness direction of the portable electronic device. Accordingly, a thickness of the portable electronic device may increase.

However, in the camera module 10 disclosed herein, an optical axis (e.g., the Y axis) of the plurality of lenses may be disposed perpendicular to a thickness direction of the portable electronic device 1, even when the camera module 10 includes AF, zoom, and OIS functions, and a size of the portable electronic device 1 may be reduced.

Figure 2:
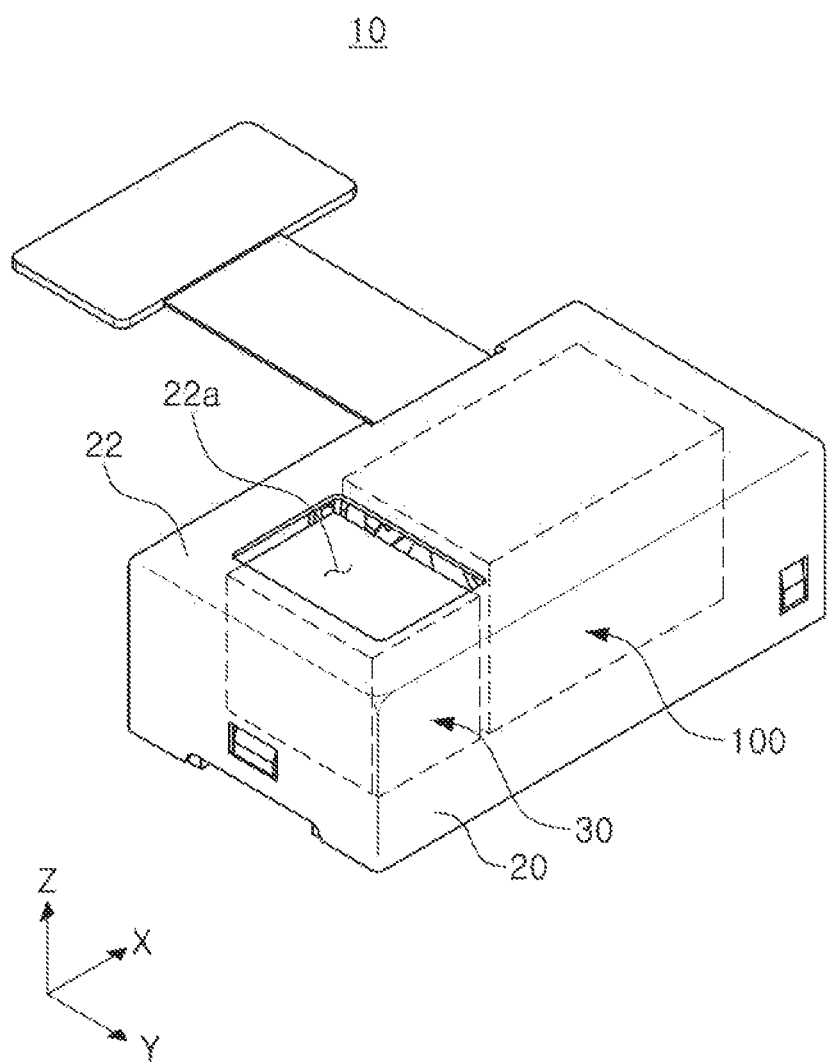
FIG. 2 is a perspective diagram illustrating a camera module, according to an embodiment.

FIG. 2 is a perspective diagram illustrating the camera module 10, according an embodiment.

Referring to FIG. 2, the camera module 10 may include, for example, a reflecting module 30, a lens module 100, and an image sensor module, disposed in a housing 20. The housing 20 may include a cover 22 covering the camera module 10, and the cover 22 may include an opening 22a in an upper portion thereof.

The reflecting module 30 may be configured to change a moving direction of light. For example, a moving direction of light incident through the opening 22a from above may be changed to be directed to the lens module 100 through the reflecting module 30. To this end, the reflecting module 30 may include a reflective member configured to reflect light.

A path of light incident through the opening 22a may be changed to be directed to the lens module 100 by the reflecting module 30. For example, a path of light incident in the thickness direction (e.g., the Z axis direction) of the camera module 10 may be changed to match the optical axis direction (e.g., the Y axis direction) by the reflective module 30.

The lens module 100 may include the plurality of lenses through which light having a path changed by the reflective module 30 passes. An image sensor module may include an image sensor configured to convert light that has passed through the plurality of lenses into an electrical signal, and a printed circuit board (not illustrated) on which the image sensor is mounted. The image sensor module may further include an optical filter configured to filter light incident to the lens module 100. The optical filter may be implemented by an infrared cut filter.

The reflective module 30 may be provided on or adjacent to a front side of (e.g., in front of) the lens module 100, in the internal space of the housing 20. The image sensor module may be provided on or adjacent to a rear side of (e.g., rearward of) the lens module 100, in the internal space of the housing 20.

Figure 3:
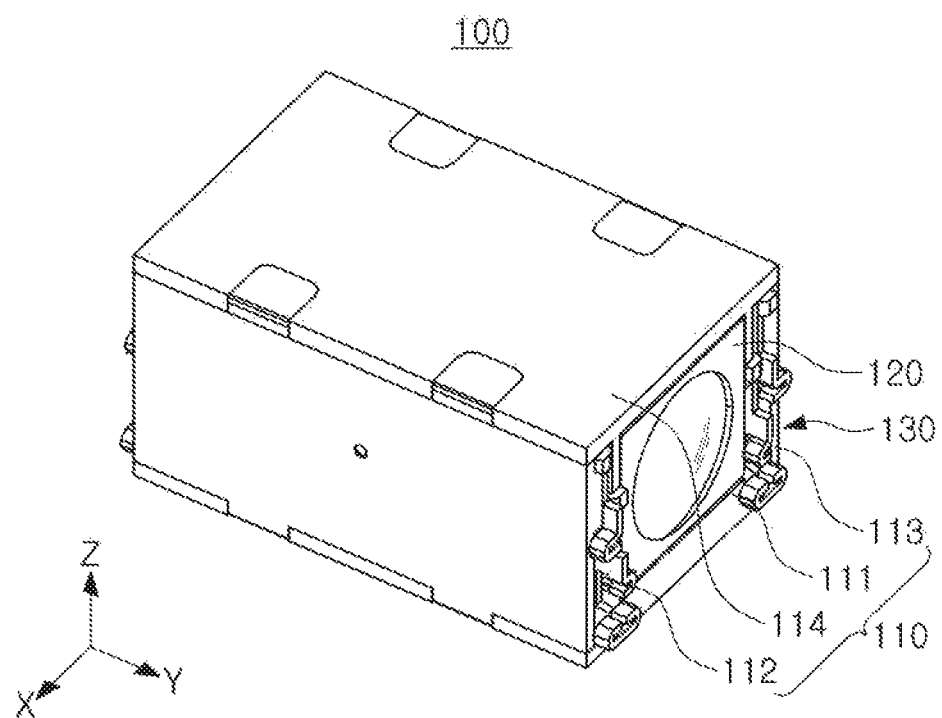
FIG. 3 is a perspective diagram illustrating a lens module, according to an embodiment.
Figure 4:
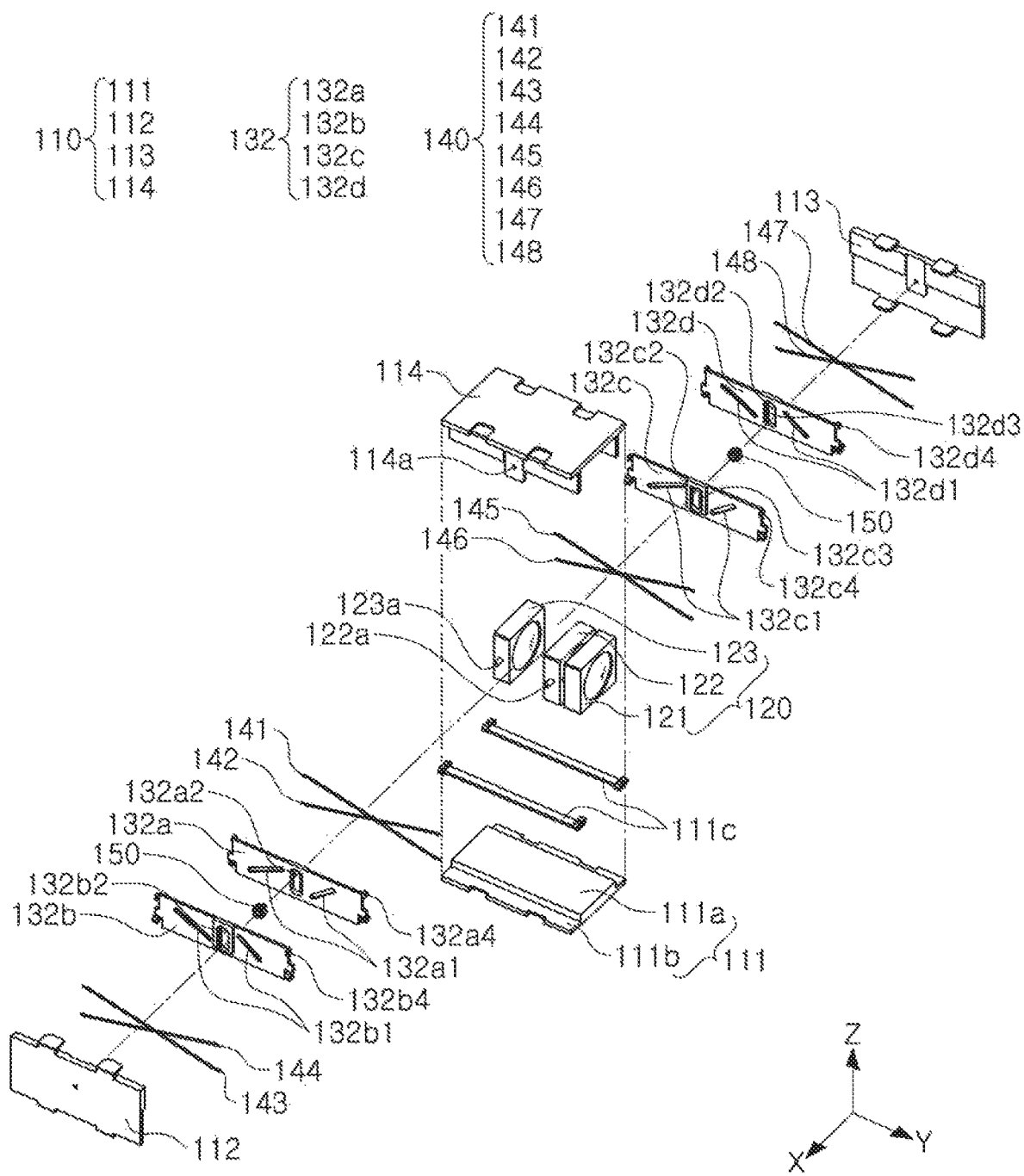
FIG. 4 is an exploded perspective diagram illustrating a lens module.

FIG. 3 is a perspective diagram illustrating the lens module 30, according to an embodiment. FIG. 4 is an exploded perspective diagram illustrating the lens module 30.

Referring to FIGS. 3 and 4, the lens module 100 may include, for example, a carrier 110, a lens unit 120, a lens guide assembly 130, and a driving wire assembly 140.

The carrier 110 may have an internal space, and the lens unit 120 may be disposed in the internal space of the carrier 110. For example, the carrier 110 may have a hexahedral box shape having open ends. The carrier 110 may include a bottom plate 111, a front plate 112 installed on one surface of the bottom plate 111, a rear plate 113 disposed opposite to the front plate 112, and a cover plate 114 disposed opposite to the bottom plate 111.

Both ends of the carrier 110 may be configured to be open.

The bottom plate 111 may include a support portion 111a on which the lens unit 120 is disposed, and a mounting portion 111b on which installation bars 111c respectively extending from two side surfaces of the support portion 111a and connected to the driving wire assembly 140 are installed. For example, the support portion 111a and the mounting portion 112b may be disposed with a stepped portion formed therebetween.

The cover plate 114 may include a first extension portion 114a and a second extension portion 114a extending to central portions of the front plate 112 and the rear plate 113, respectively. A first lifting support gear 150 may be rotatably coupled to the first extension portion 114a and the front plate 112, and the second lifting support gear 150 may be rotatably coupled to the second extension portion 114a and the rear plate 113.

A thickness direction of the carrier 110 may be the Z axis direction illustrated in FIGS. 3 and 4, a length direction of the carrier 110 may be the Y axis direction illustrated in FIGS. 3 and 4, and a width direction of the carrier 110 may be the X axis direction illustrated in FIGS. 3 and 4.

The lens unit 120 may include a plurality of lens groups, and may be installed in the carrier 110 so as to be disposed in an internal space of the carrier 110. For example, the lens unit 120 may include a first lens group 121 fixed to (e.g., being fixed in position on the carrier so as to not be movable with respect to the carrier) and installed on one end of the carrier 110, and a second lens group 122 disposed on one side of the first lens group 121 and moveably installed in the carrier 110, and a third lens group 123 disposed on one side of the second lens group 122 and moveably installed in the carrier 110.

The second and third lens groups 122 and 123 may be connected to a lens guide assembly 130 and may move in a Y axis direction. To this end, coupling projections 122a and 123a for connection with the lens guide assembly 130 may be provided in the second and third lens groups 122 and 123, respectively.

At least one of the first, second, and third lens groups 121, 122, and 123 included in the lens unit 120 may include a plurality of lenses.

The lens guide assembly 130 may include a plurality of guide members 132 respectively disposed on two side surfaces of each of the lens groups 121, 122, and 123 to guide movement of at least two lens groups among the first second and third lens groups 121, 122, and 123. Accordingly, the lens guide assembly 130 may be configured to guide movement of a portion of the lens groups included in the lens unit 120, for example, the second and third lens groups 122 and 123. The plurality of guide members 132 may include a first guide member 132a disposed on one side of the second and third lens groups 122 and 123, a second guide member 132b disposed to overlap the first guide member 132a, a third guide member 132c disposed on the other side of the second and third lens groups 122 and 123, and a fourth guide member 132d disposed to overlap the third guide member 132c.

The first guide member 132a may include a plurality of first guide holes 132a1 arranged to be inclined in one direction, and the second guide member 132b may include a plurality of second guide holes 132b1 arranged to respectively intersect the first guide holes 132a1. Also, the third guide member 132c may include a plurality of third guide holes 132c1 arranged to be inclined in one direction, and the fourth guide member 132d may include a plurality of fourth guide holes 132d1 disposed to intersect the third guide holes 132c1.

The first guide member 132a may include a first gear installation hole 132a2 disposed in a central portion, and the second guide member 132b may include a second gear installation hole 132b2 disposed in a central portion and corresponding to the first gear installation hole 132a2. The third guide member 132c may include a third gear installation hole 132c2 disposed in a central portion, and the fourth guide member 132d may include a fourth gear installation hole 132d2 corresponding to the third gear installation hole 132c2.

Figure 10:
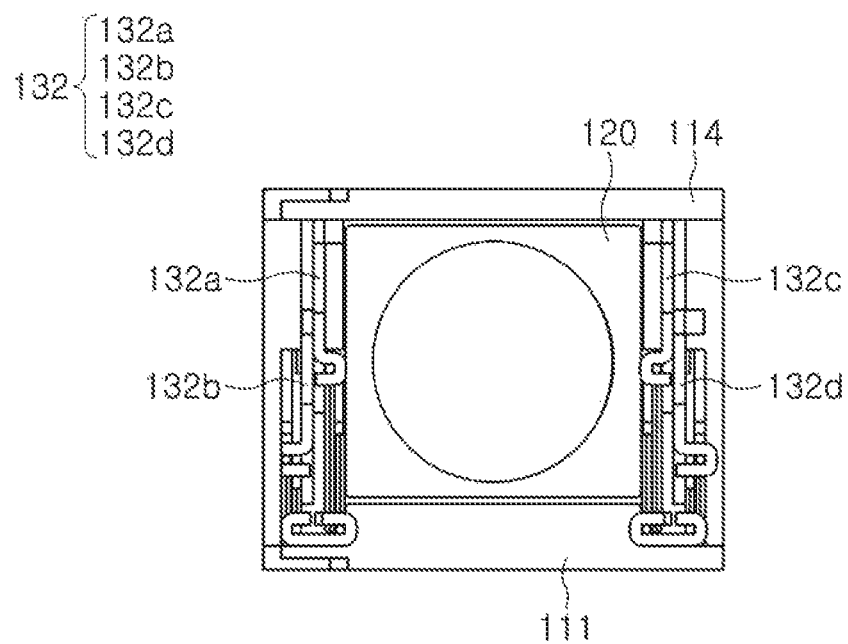

First to fourth thread portions 132a3, 132b3, 132c3, and 132d3 (see FIGS. 6, 8, and 10) respectively disposed in the first to fourth installation holes 132a2, 132b2, 132c2, and 132d2 may be provided in internal surfaces of the first to fourth guide members 132a, 132b, 132c, and 132d, respectively. The first lifting support gear 150 may be coupled to the first and second thread portions 132a3 and 132b3, and the second lifting support gear 150 may be coupled to the third and fourth thread portions 132c3 and 132d3.

First to fourth detachment prevention holes 132a4, 132b4, 132c4, and 132d4 for preventing detachment from the carrier 110 may be disposed on both ends of the first to fourth guide members 132a, 132b, 132c, and 132d, respectively.

The driving wire assembly 140 may generate driving force for moving the lens unit 120. For example, the driving wire assembly 140 may include at least two driving wires connected to the guide members 132, and the at least two driving wires may be formed of a shape memory alloy. For example, the driving wire assembly 140 may include first and second driving wires 141 and 142 connected to the first guide member 132a and intersecting each other, third and fourth driving wires 143 and 144 connected to the second guide member 132b and intersecting each other, fifth and sixth driving wires 145 and 146 connected to the third guide member 132c and intersecting each other, and seventh and eighth driving wires 147 and 148 connected to the fourth guide member 132d and intersecting each other.

First ends of the first to eighth driving wires 141 to 148 may be connected to the respective guide members 132a, 132b, 132c, and 132d, and the second ends of the first to eighth driving wires 141 to 148 may be connected to the respective installation bar 111c of the carrier 110.

Accordingly, the second and third lens groups 122 and 123 of the lens unit 120 may move in a Y axis direction in the carrier 110 according to expansion and contraction of the first to eighth driving wires 141 to 148, due to the first to eighth driving wires 141 to 148 being formed of the shape memory alloy.

As described above, a moving distance of the second and third lens groups 122 and 123 may increase such that image quality degradation of a high magnification zoom function may be prevented.

Also, by moving the second and third lens groups 122 and 123 through the driving wires 140, the lens module 100 may have a reduced size and thickness.

Further, by guiding the movement of the second and third lens groups 122 and 123 through the lens guide assembly 130, the second and third lens groups 122 and 123 may stably move.

In addition, by moving the lens guide assembly 130 upwardly and downwardly through the driving wire assembly 140, the second and third lens groups 122 and 123 may move in a direction of incidence of light. Accordingly, a moving distance of the second and third lens groups 122 and 123 may be sufficiently secured, even through the driving wire assembly 140 having a limited amount of dislocation and being formed of a shape memory alloy, such that degradation of image quality of a high magnification zoom function may be prevented.

FIGS. 5 to 10 are diagrams illustrating operation of the lens module 100, according to an embodiment.

Figure 5:
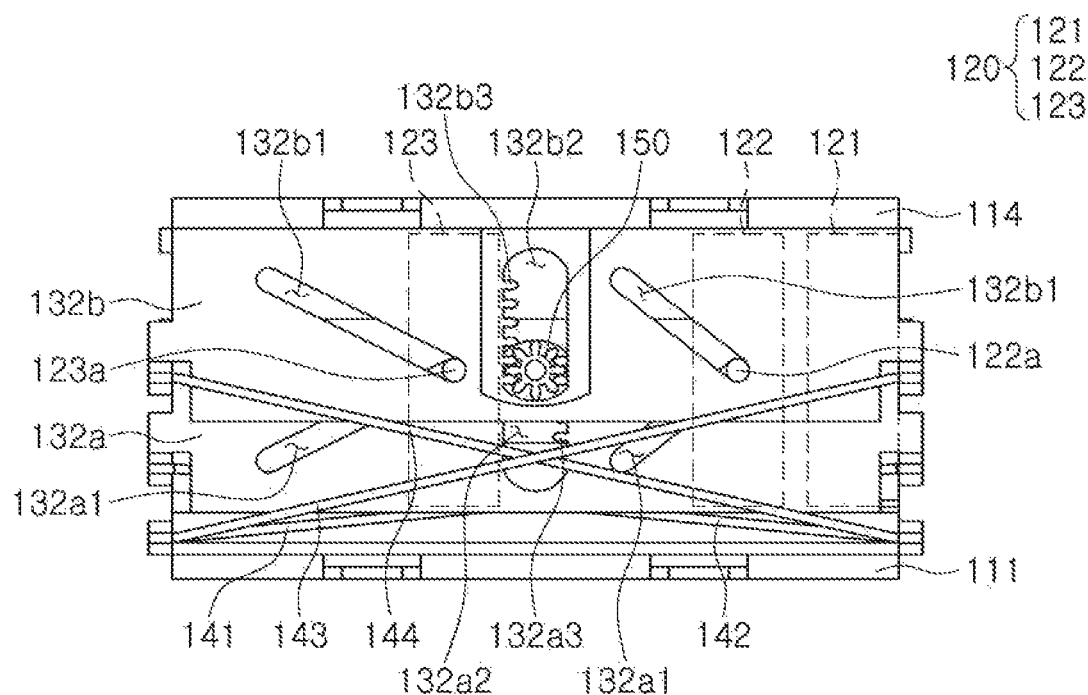
FIGS. 5 to 10 are diagrams illustrating operation of the lens module, according to an embodiment of the present disclosure.
Figure 6:
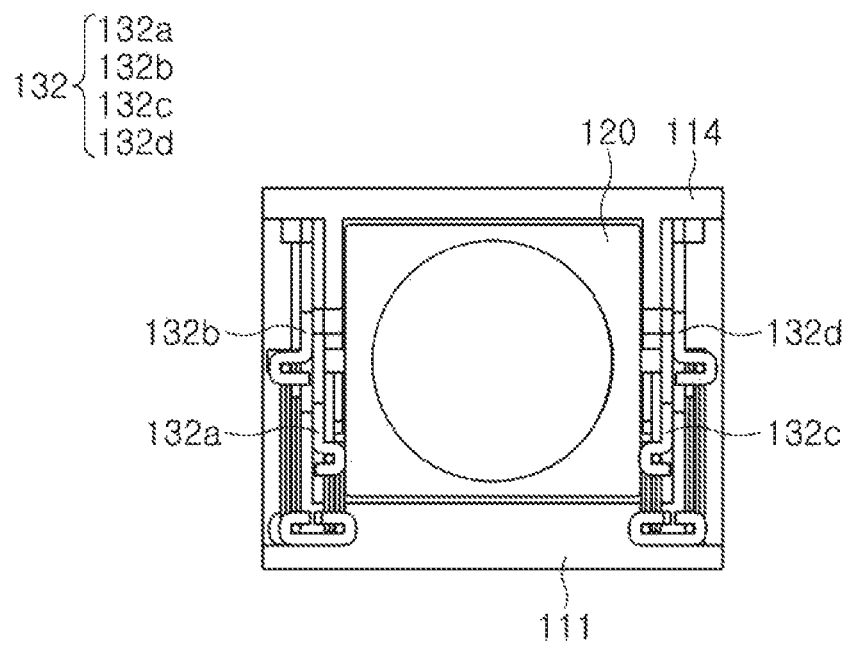

As illustrated in FIGS. 5 and 6, when power is not supplied to the driving wire assembly 140, a lower surface of the first guide member 132a may be disposed adjacent to the bottom plate 111 of the carrier 110, and an upper surface of the second guide member 132b may be disposed adjacent to the cover plate 114 of the carrier 110. In this case, the second lens group 122 may be disposed adjacent to the first lens group 121 (see FIG. 4). Further, the coupling projections 122a and 123a of the second and third lens groups 122 and 123 may be disposed on first ends of the first and second guide holes 132a1 and 132b1 of the first and second guide members 132a and 132b, respectively. In this case, the first lifting support gear 150 may be disposed on an upper end of the first gear installation hole 132a2 and a lower end of the second gear installation hole 132b2.

Figure 7:
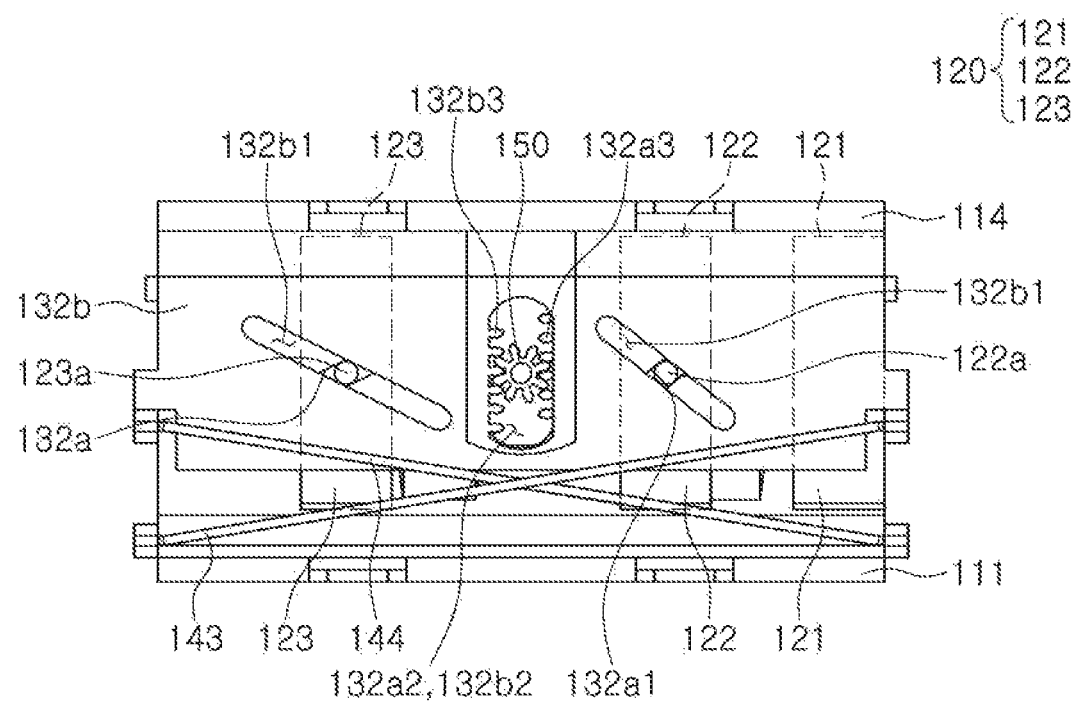
Figure 8:
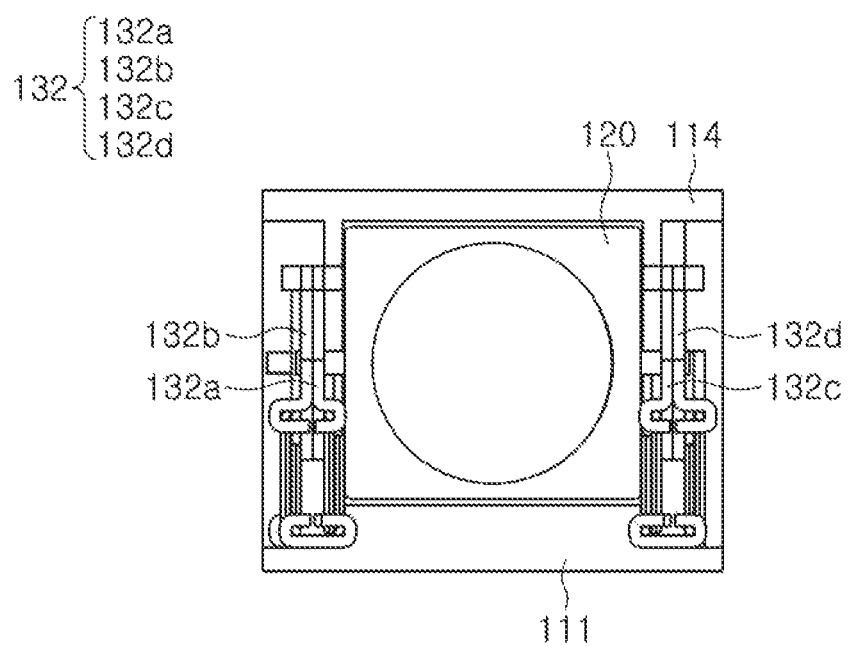

Thereafter, when power is supplied to the driving wire assembly 140, the first and second driving wires 141 and 142 may be extended and the third and fourth driving wires 143 and 144 may be reduced. Accordingly, the first guide member 132a may move to an upper position, and the second guide member 132b may move to a lower position. Thereafter, as illustrated in FIGS. 7 and 8, the first and second driving wires 141 and 142 may be disposed at the same height and may overlap each other. The coupling projections 122a and 123a of the second and third lens groups 122 and 123 may be disposed in central portions of the first and second guide holes 132a1 and 132b1 of the first and second guide members 132a and 132b, respectively. The first lifting support gear 150 may be disposed in central portions of the first gear installation hole 132a2 and the second gear installation hole 132b2. Also, lifting of the first and second guide members 132a and 132b may be stably performed by the first lifting support gear 150.

Figure 9:
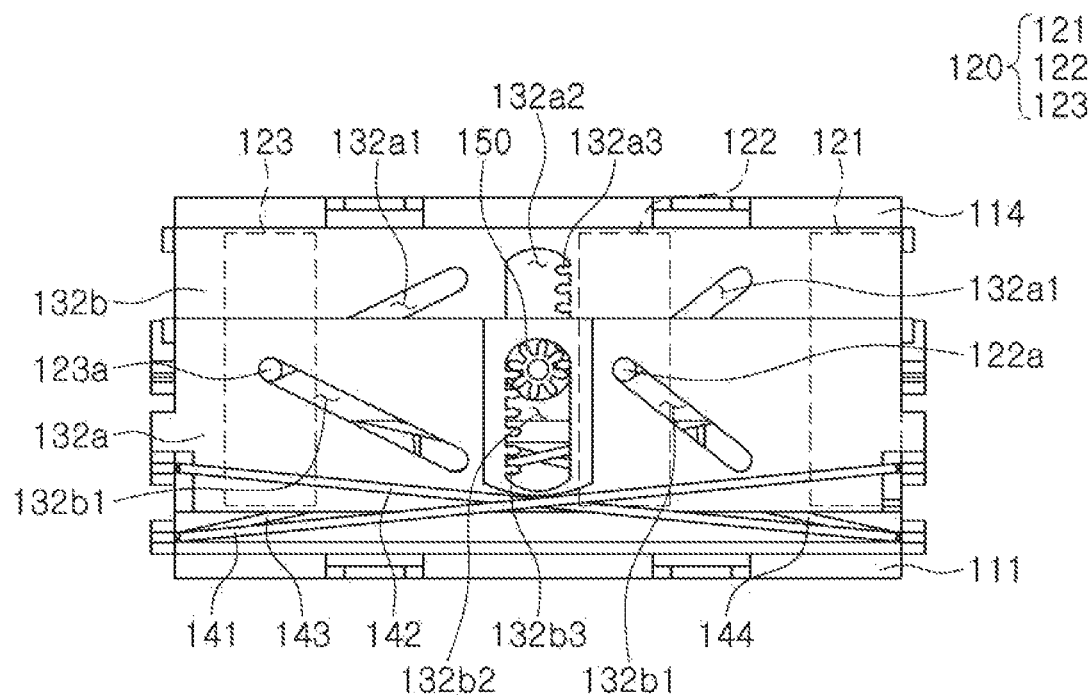

When power is continuously supplied to the driving wire assembly 140, the first and second driving wires 141 and 142 may continuously extend, and the third and fourth driving wires 143 and 144 may continuously reduce. Accordingly, as illustrated in FIGS. 9 and 19, a lower surface of the second guide member 132b may be disposed adjacent to the bottom plate 111 of the carrier 110, and an upper surface of the first guide member 132a may be disposed adjacent to the cover plate 114 of the carrier 110. In this case, the coupling projections 122a and 123a of the second and third lens groups 122 and 123 may be disposed on second ends of the first and second guide holes 132a1 and 132b1 of the first and second guide members 132a and 132b, respectively. In this case, the first lifting support gear 150 may be disposed on a lower end of the first gear installation hole 132a2 and an upper end of the second gear installation hole 132b2.

In the above example embodiment, operations of the first and second guide members 132a and 132b are described, but the third and fourth guide members 132c and 132d may operate in the same manner described above. In other words, the first guide member 132a and the third guide member 132c may operate the same, and the second guide member 132b and the fourth guide member 132d may operate in the same manner. Also, the fifth and sixth driving wires 145 and 146 may operate in the same manner as the first and second driving wires 141 and 142, respectively, and the seventh and eighth driving wires 147 and 148 may operate in the same manner as the third and fourth driving wires 143 and 144, respectively. Additionally, the second lifting support gear 150 may operate in the same manner as the first lifting support gear 150.

As described above, as the second and third lens groups 122 and 123 may move in a length direction (a Y axis direction) of the carrier 110, a moving distance of the second and third lens groups 122 and 123 may increase such that degradation of image quality of the high magnification zoom function may be prevented.

Also, by moving the second and third lens groups 122 and 123 through the driving wire assembly 140, the lens module 100 may have a reduced size and thickness.

Further, by guiding movement of the second and third lens groups 122 and 123 through the lens guide assembly 130, the first and second lens groups 122 and 123 may stably move. Further, by supporting movement of the plurality of guide members 132 through the first and second lifting support gears 150, the plurality of guide members 132 may be stably lifted.

Further, by moving the lens guide assembly 130 upwardly and downwardly through the driving assembly 140, the second and third lens groups 122 and 123 may move in a direction of incidence of light. Accordingly, a moving distance of the second and third lens groups 122 and 123 may be sufficiently secured, even through the driving wire assembly 140 having a limited amount of dislocation and being formed of a shape memory alloy, such that degradation of image quality of the high magnification zoom function may be prevented.

According to the embodiments disclosed herein, lenses of a lens module may move smoothly.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module, comprising:
a carrier having an internal space;
a lens unit comprising a plurality of lens groups, the lens unit being installed on the carrier such that at least one of the lens groups is configured to move in a length direction of the carrier;
a lens guide assembly comprising a first guide member disposed on first side surfaces of each of the lens groups, a second guide member disposed to overlap the first guide member in a direction traverse to the length direction of the carrier, a third guide member disposed on second side surfaces of each of the lens groups, and a fourth guide member disposed to overlap the third guide member in the direction traverse to the length direction of the carrier, the first, second, third, and fourth guide members being configured to guide movement of at least two lens groups among the plurality of lens groups; and
at least two driving wires connected to the guide members and formed of a shape memory alloy.

2. The lens module of claim 1, wherein the first guide member includes a plurality of first guide holes disposed to be inclined in one direction, and the second guide member includes a plurality of second guide holes disposed to intersect the first guide holes, and
wherein the third guide member includes a plurality of third guide holes disposed to be inclined in the one direction, and the fourth guide member includes a plurality of fourth guide holes disposed to intersect the third guide holes.

3. The lens module of claim 1, wherein the first guide member includes a first gear installation hole disposed in a central portion of the first guide member, and the second guide member includes a second gear installation hole disposed to correspond to the first gear installation hole, and
wherein the third guide member includes a third gear installation hole disposed in a central portion the third guide member, and the fourth guide member includes a fourth gear installation hole disposed to correspond to the third gear installation hole.

4. The lens module of claim 3, wherein the first to fourth gear installation holes include thread portions disposed on internal surfaces of the first to fourth guide members, respectively.

5. The lens module of claim 4, further comprising a plurality of lifting support gears engaged with the thread portions.

6. The lens module of claim 1, wherein the first to fourth guide members include detachment prevention holes configured to prevent detachment of the first to fourth guide members from the carrier.

7. The lens module of claim 1, wherein the at least two driving wires include first and second driving wires connected to the first guide member and intersecting each other, third and fourth driving wires connected to the second guide member and intersecting each other, fifth and sixth driving wires connected to the third guide member and intersecting each other, and seventh and eighth driving wires connected to the fourth guide member and intersecting each other.

8. The lens module of claim 1, wherein the carrier includes a bottom plate, a front plate disposed on one surface of the bottom plate, a rear plate disposed to oppose the front plate, and a cover plate disposed to oppose the bottom plate.

9. The lens module of claim 8, wherein an extension portion is disposed on the cover plate and extends to a central portion of each of the front plate and the rear plate,
wherein a first lifting support gear is rotatably coupled to the extension portion and the front plate, and
wherein a second lifting support gear is rotatably coupled to the extension portion and the rear plate.

10. The lens module of claim 8, wherein the bottom plate includes:
a support portion having an upper surface on which the lens unit is disposed; and
a mounting portion on which an installation bar connected to first ends of the at least two driving wires is disposed.

11. The lens module of claim 10, wherein second ends of the at least two driving wires are connected to a respective guide member among the guide members.

12. The lens module of claim 1, wherein the lens unit includes a first lens group fixed to and installed on one end of the carrier, a second lens group disposed on a rear end of the first lens group in a light incident direction and configured to move, and a third lens group disposed on a rear end of the second lens group and configured to move.

13. The lens module of claim 12, wherein the second and third lens groups include coupling projections coupled to a respective guide member among the guide members.

14. A camera module, comprising:
a reflective module configured to change light incident to the camera module; and
a lens module configured to pass light having a path changed by the reflective module, wherein the lens module comprises:
a carrier having an internal space;
a lens unit comprising a plurality of lens groups, the lens unit being installed on the carrier such that at least one of the lens groups is configured to move in a length direction of the carrier;
a lens guide assembly comprising a plurality of guide members disposed on side surfaces of each of the lens groups, and configured to guide movement of at least two lens groups among the plurality of lens groups;
at least two driving wires connected to the plurality of guide members and formed of a shape memory alloy; and
a plurality of lifting support gears engaged with thread portions of the plurality of guide members.

15. The camera module of claim 14, wherein the thread portions are disposed in gear installation holes disposed in central portions of the plurality of guide members.

* * * * *